(No Model.)

G. W. BOWN.
ASH SIFTER.

No. 399,371. Patented Mar. 12, 1889.

Witnesses:
Geo. H. Schreiber
F. H. Schreiber

Inventor:
Geo. W. Bown

UNITED STATES PATENT OFFICE.

GEORGE WASHINGTON BOWN, OF PHILADELPHIA, PENNSYLVANIA.

ASH-SIFTER.

SPECIFICATION forming part of Letters Patent No. 399,371, dated March 12, 1889.

Application filed June 27, 1888. Serial No. 278,383. (No model.)

*To all whom it may concern:*

Be it known that I, GEORGE WASHINGTON BOWN, of Philadelphia, in the county of Philadelphia and State of Pennsylvania, have invented a new and useful Improvement in Ash-Sifters, of which the following is a specification.

My invention is an improvement in ash-sifters; and it consists in certain features of construction and novel combinations of parts, as will be hereinafter described and claimed.

Figure 1:
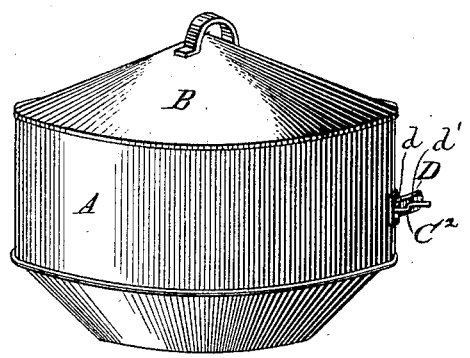
Figure 2:
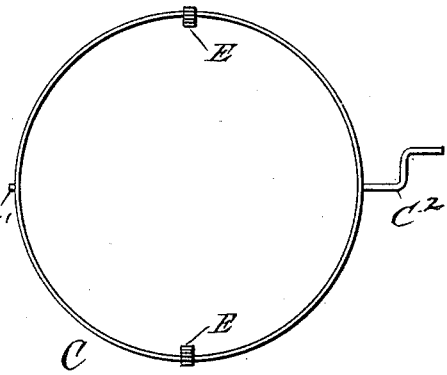
Figure 3:
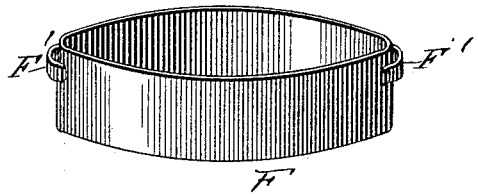
Figure 4:
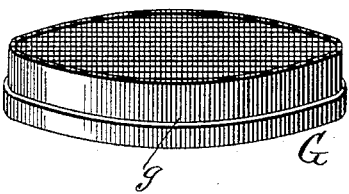

In the drawings, Figure 1 is a side view in perspective of my improved sifter. Fig. 2 is a detail view of the operating-ring. Fig. 3 is a detail view of the ash-pan. Fig. 4 is a detail view of the sieve, and Fig. 5 is a perspective view of the device with the casing partly broken away.

My improved sifter comprises, in the construction shown, a casing, A, having a suitable lid, B, and provided at diametrically-opposite points with bearings $a$, the ring C, having trunnions $C'$ $C^2$, the latter being extended to form the crank-handle, the pan F, and the sieve G.

Figure 5:
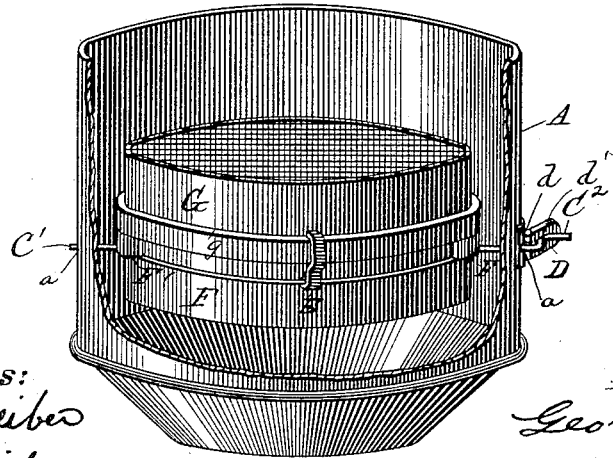

The ring C is provided with clamps E, for securing the sieve and ash-pan together for the purpose of sifting, such clamps being preferably formed of spring plates or straps fixed between their ends to the ring C, and adapted at their ends to engage the pan and sieve, as will be understood from Fig. 5.

The pan is provided with handles $F'$, and it is usual to engage the springs E with the handles $F'$, while the sieve G is provided with a shoulder, $g$, or other suitable catch for said springs.

For the purpose of holding the sieve and pan E from turning when detaching the sieve from the pan after sifting is done, I provide a latch, D, arranged to engage the crank-handle $C^2$, and hold same, and consequently the ring and parts thereto attached, from turning. This latch D is a bar or plate of metal having a hinged or pivotal connection at $d$ with the casing, and having a slot, $d'$, formed to receive the bend of crank $C^2$, so that when such crank is turned to a horizontal position and the plate D is turned outward, the parts within the casing will be securely locked in position.

The operation will be readily understood. The pan may be filled with ashes and cinders, and such pan and the sieve be applied to the ring C, as described, when by turning the crank the said parts, which form what might be called the "revolving sifter," will be slowly revolved and the ashes soon sifted from the cinders, when the parts F G may be removed.

It will be seen that the easy and complete removal of the pan and sieve enables the use of such parts detached from the case for any desired purpose. The funnel shape of the lower open end of the casing A renders it easily applicable to a barrel, so the ashes may be conveniently sifted thereinto when desired.

It will be understood that by my invention I can lock the sieve to an ordinary ash-pan— for instance, such as is used in base-burner stoves—and thereby convert the two into a sifter for separating the ashes from the coal before removing the coal from the pan.

Having thus described my invention, what I claim as new is—

1. The improved sifter herein described and shown, consisting of the casing A, having the bearings $a$ and provided with the latch D, pivoted at $d$ and provided with a slot, $d'$, the ring C, having trunnions journaled in bearings $a$, the spring-catches secured between their ends to the ring C and extended at such ends, whereby to engage the pan and sieve, and the pan and sieve, all substantially as set forth.

2. The sifter herein described, comprising the sieve having a shoulder or catch, $g$, the pan having handles $F'$, the ring C, formed to fit over the pan below the handles $F'$, and having the clamps E, engaging the shoulder or catch $g$, the trunnions on ring C, and the casing having bearings for said trunnions, substantially as set forth.

GEORGE WASHINGTON BOWN.

Witnesses:
GEO. W. SCHREIBER,
W. H. SCHREIBER.